US012118639B2

(12) United States Patent
Billyard (10) Patent No.: US 12,118,639 B2
(45) Date of Patent: *Oct. 15, 2024

(54) METHOD AND SYSTEM FOR INTERACTIVE GRAPHICS STREAMING

(71) Applicant: Mythical, Inc., Sherman Oaks, CA (US)

(72) Inventor: Adam Billyard, Sussex (GB)

(73) Assignee: Mythical, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,828

(22) Filed: Jan. 12, 2021

(65) Prior Publication Data

US 2021/0133916 A1 May 6, 2021

Related U.S. Application Data

(63) Continuation of application No. 16/528,862, filed on Aug. 1, 2019, now Pat. No. 10,915,984, which is a
(Continued)

(51) Int. Cl.
*G06T 1/20* (2006.01)
*G06F 3/14* (2006.01)
(Continued)

(52) U.S. Cl.
CPC .................. *G06T 1/20* (2013.01); *G06F 3/14* (2013.01); *G06T 1/60* (2013.01); *H04L 65/60* (2013.01);
(Continued)

(58) Field of Classification Search
CPC ......... G06T 1/20; G06T 1/60; G06T 2200/16; G06T 2200/24; G06F 3/14; H04L 65/60;
(Continued)

(56) References Cited

U.S. PATENT DOCUMENTS 7,593,010 B2 * 9/2009 Wang ...................... G06T 15/30
345/421
9,026,615 B1 * 5/2015 Sirton .................. H04N 19/593
709/217
(Continued)

FOREIGN PATENT DOCUMENTS

CN 101918921 A 12/2010
EP 1320240 A2 * 6/2003 ......... G06F 16/9577
WO WO-2010077423 A1 * 7/2010 ............. G06T 9/001

OTHER PUBLICATIONS

International Search Report mailed Jul. 16, 2015, issued in International Application No. PCT/GB2015/050128, 2 pages.
(Continued)

*Primary Examiner* — Maurice L. McDowell, Jr.
*Assistant Examiner* — Donna J. Ricks
(74) *Attorney, Agent, or Firm* — Esplin & Associates, PC (57) ABSTRACT

The present invention relates to a method of streaming interactive computer graphics from a server to a client device. The method includes the steps of: intercepting graphics instructions transmitted from an application destined for a graphical processing unit (GPU) at the server; processing the graphics instructions to generate graphics data at the server; generating index information for, at least, some of the graphics data at the server; transmitting the index information in place of the graphics data to a client device; extracting corresponding graphics data stored at the client device utilizing the index information; and rendering computer graphics at a graphical processing unit (GPU) at the client device using the corresponding graphics data. A system for streaming interactive computer graphics is also disclosed.

15 Claims, 9 Drawing Sheets

Related U.S. Application Data continuation-in-part of application No. 15/113,176, filed as application No. PCT/GB2015/050128 on Jan. 21, 2015, now Pat. No. 10,410,312.

(60) Provisional application No. 61/929,538, filed on Jan. 21, 2014.

(51) Int. Cl.
*G06T 1/60* (2006.01)
*H04L 65/60* (2022.01)
*H04L 67/01* (2022.01)

(52) U.S. Cl.
CPC ...... *G06T 2200/16* (2013.01); *G06T 2200/24* (2013.01); *H04L 67/01* (2022.05)

(58) Field of Classification Search
CPC . H04L 67/42; H04L 67/2819; H04L 67/1097; H04L 67/2842; H04L 65/80
See application file for complete search history.

(56) References Cited

U.S. PATENT DOCUMENTS

| | | | | |
|---|---|---|---|---|
| 9,451,197 | B1* | 9/2016 | Krause | G06T 15/04 |
| 10,915,984 | B2* | 2/2021 | Billyard | G06T 1/20 |
| 2002/0029285 | A1* | 3/2002 | Collins | H04L 67/36 |
| | | | | 707/E17.121 |
| 2002/0032751 | A1* | 3/2002 | Bharadwaj | H04M 3/4938 |
| | | | | 348/E7.071 |
| 2005/0231504 | A1* | 10/2005 | Heng | G06T 15/40 |
| | | | | 345/582 |
| 2006/0176310 | A1* | 8/2006 | Arnaud | G06T 15/04 |
| | | | | 345/582 |
| 2008/0021679 | A1 | 1/2008 | Bleiweiss et al. | |
| 2009/0189890 | A1* | 7/2009 | Corbett | G06T 15/005 |
| | | | | 345/419 |
| 2010/0293248 | A1 | 11/2010 | Kamay et al. | |
| 2011/0255791 | A1 | 10/2011 | Abdo et al. | |
| 2013/0031482 | A1 | 1/2013 | Saul et al. | |
| 2014/0035900 | A1 | 2/2014 | Slavin | |
| 2014/0125649 | A1 | 5/2014 | Carlin | |

OTHER PUBLICATIONS

Communication issued Jun. 12, 2019 in European Application No. 15 704 359.7.
Chinese Office Action issued Nov. 5, 2018 in Chinese Application No. 201580004994.7 (with English Translation).

* cited by examiner

METHOD AND SYSTEM FOR INTERACTIVE GRAPHICS STREAMING

REFERENCE TO RELATED APPLICATIONS

This application is a continuation of U.S. application Ser. No. 16/528,862 filed 1 Aug. 2019, which is a continuation in part of U.S. application Ser. No. 15/113,176 filed 21 Jul. 2016, which is the U.S. national phase of International Application No. PCT/GB2015/050128 filed 21 Jan. 2015, which designated the U.S. and claims the benefit of U.S. Provisional Application No. 61/929,538 filed 21 Jan. 2014, the entire contents of each of which are hereby incorporated by reference.

FIELD OF INVENTION

The present invention is in the field of interactive graphics streaming. More particularly, but not exclusively, the present invention relates to interactive graphics streaming from an application on a server for display by a GPU on a remote client.

BACKGROUND

In the field of interactive graphics application (such as computer games), users typically download, or obtain by physical media, the applications and execute them locally on their devices.

However, some providers of interactive graphics application desire the flexibility and control of executing the graphics applications at a server and streaming the rendered graphics from the applications to users across a network for display on the user's device.

The existing state of the art in this form of streaming graphics content, execute applications on a specialist server that provides a CPU, memory, backing store and a Graphics Processing Unit (GPU) which is used to render the output of the application into a Framebuffer of pixels. The resulting pixels are then retrieved and encoded into a traditional video stream (e.g. h.264) and sent to the client.

There are a number of disadvantages with this approach. Firstly, the servers have to be extremely powerful to run compute and graphics intensive applications for many users simultaneously; this results in a high power usage (and thus also cooling costs) which are a significant issue in determining business viability.

Second, existing video standards such as h.264 are inherently 'lossy' meaning that they lose image fidelity during encoding. Compression artefacts can be reduced by increasing the bandwidth requirements of the stream, but there is a hard limit on bandwidth into users' premises and a soft limit on the amount of bandwidth out of the datacenter where the servers are co-located. This means these systems have to accept introducing compression artefacts into the content stream to be viable.

Thirdly, the real-time compression of video is a hugely compute intensive process in which the bandwidth requirements of the resultant stream is a function of the amount of compression processing that has been allocated. This adds to the server load and latency of the system.

Fourthly, millions of consumer devices (e.g. tablets, mobiles, and smart TVs) increasingly contain powerful GPUs that are a resource that is largely under utilised when all the applications graphics processing occurs on the server.

Fifthly, display resolutions are increasing rapidly with many devices now offering 3840×2160 pixels and "8 k smartTV" (8192 pixel wide displays) arriving soon. A compression system based around pixels (such as h.264) means that to get the fidelity needed for these displays means increasing the bandwidth of the encoded video stream.

Therefore, it would be desirable if an interactive graphics streaming system could be developed where the application is executed on a server and the graphics rendered by a local GPU at the client device.

One such system is described in the article "Low Delay Streaming of Computer Graphics", P Eisert and P Fechteler, 15th IEEE International Conference on Image Processing, ICIP 2008. However, the method described in this article includes shadowing the server memory at the client. This shadowing is bandwidth intensive and shadowing of the entirety of the graphics data may not even be necessary (for example, the resolution limitations of the particular client device may not support high resolution textures).

The MPEG-4 standard describes the transmission of compressed geometry meshes and textures to a remote device and could be adapted to provide an interactive graphics streaming system. However, to implement MPEG-4 for a standalone interactive application would require modifications to the application. Furthermore, the MPEG-4 standard would result in potential retransmission of graphics data from the server to the client for each new stream resulting in inefficient use of bandwidth between server and client.

Therefore, an interactive graphics streaming system is desired which provides improved use of the bandwidth between the server and client, is adaptable to different client device capabilities, and requires minimal or no reprogramming of the interactive graphics application.

It is an object of the present invention to provide a method and system for interactive graphics streaming which meets the above desires while overcomes the disadvantages of the prior art, or at least provides a useful alternative.

SUMMARY OF INVENTION

According to a first aspect of the invention there is provided a method of streaming interactive computer graphics from a server to a client device, including:
   a) intercepting graphics instructions transmitted from an application destined for a graphical processing unit (GPU) at the server;
   b) processing the graphics instructions to generate graphics data at the server;
   c) generating index information for, at least, some of the graphics data at the server;
   d) transmitting the index information in place of the graphics data to a client device;
   e) extracting corresponding graphics data stored at the client device utilizing the index information; and
   f) rendering computer graphics at a graphical processing unit (GPU) at the client device using the corresponding graphics data.

The graphics data may include one or more from the set of graphics state, static resources, and dynamic resources.

Objects within the graphics data may be hashed to generate the index information.

The dynamic resources may include a vertex buffer and index information may be generated for modified portions of the vertex buffer. The vertex buffer may be divided into blocks and index information generated for a run of modified blocks. The index information may be generated for a trimmed run of modified blocks such that the run extends from the first modified bit within the first block in the run to the last modified bit within the last block in the run. The vertex buffer may be divided into stripes corresponding to vertex fields and index information generated for modified stripes.

The method of the first aspect may further include the step of synchronizing the graphics data between the server and the client. When the graphics data includes textures, only data for the textures that is used may be synchronized. The profile of the client device may determine the synchronization of graphics data. The profile of the client device may determine the synchronization of graphics data by assigning lower resolution graphics for higher resolution graphics at the client device.

The rendered graphics may be displayed on a display at the client device. The client device may receive user input in response to the displayed graphics, and the user input may be transmitted back to the executing application on the server. The user input may be transmitted, at least in part, using User Datagram Protocol (UDP). State Transition Events may be synthesised on the server.

The application may be selected for execution at the server by a user from a plurality of applications According to a further aspect of the invention there is provided a system for streaming interactive computer graphics, including:

a server configured for intercepting graphics instructions transmitted from an application destined for a graphical processing unit (GPU) at the server, processing the graphics instructions to generate graphics data, generating index information for, at least, some of the graphics data, transmitting the index information in place of the graphics data to a client device; and a client device configured for extracting corresponding graphics data stored at the client device utilizing the index information and rendering computer graphics at a graphical processing unit (GPU) at the client device using the corresponding graphics data.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and system for interactive graphics streaming from a server to a client device.

The system captures output of the application executing on the server and uses semantic-driven compression to enable the output to be rendered locally on the client using its own graphics processing unit (GPU) in real-time. User input on the client device is feed back to the server to enable interaction with the executing application.

Data driving the application and the processing of that data is kept secure on the server while the graphics results are streamed for rendering on the client device.

This enables the client device to utilise its GPU to shift processing cost from the server whilst retaining the security advantages of a client-server architecture.

Figure 1:
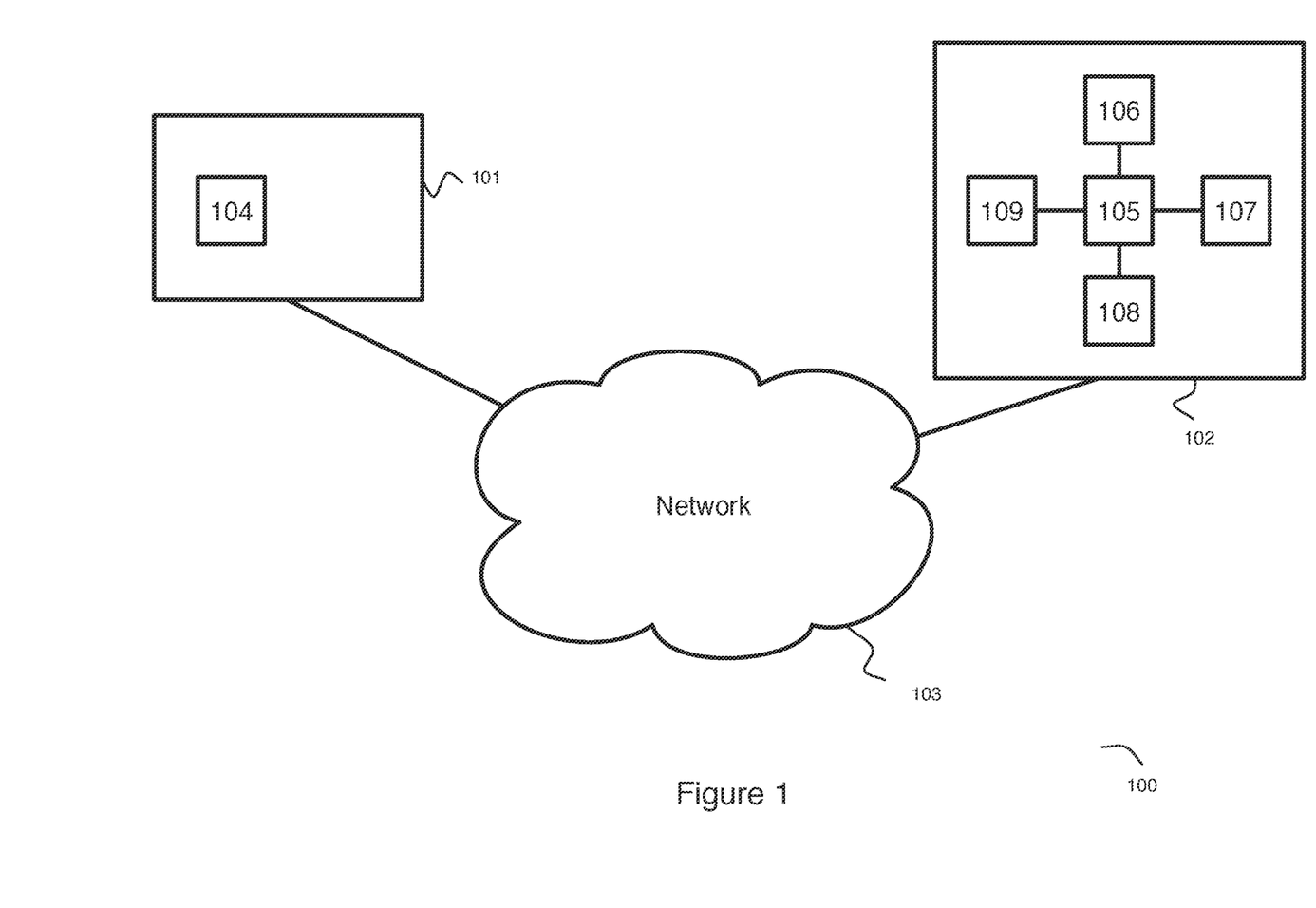
FIG. 1: shows a hardware diagram illustrating a system in accordance with an embodiment of the invention.

In FIG. 1, an interactive graphics streaming system 100 in accordance with an embodiment of the invention is shown.

The system 100 includes a server 101 and at least one client device 102. The server 101 and client devices 102 may communicate via a communications network 103.

The server 101 may include a central processing unit 104 configured to execute an application module, an interceptor module, a processing module, and a communications module.

The client devices 102 may include a central processing unit 105 configured to execute a second processing module, a local storage 106 configured to store index graphics data, and a graphics processing unit (GPU) 107 configured to render graphics. The client devices 102 may also include a user input 108 and a display device 109. The display device 109 may be configured to display the rendered graphics to a user. The client devices 102 may be further configured to receive input from a user in response the displayed graphics and transmit the input to the server 101.

Figure 2:
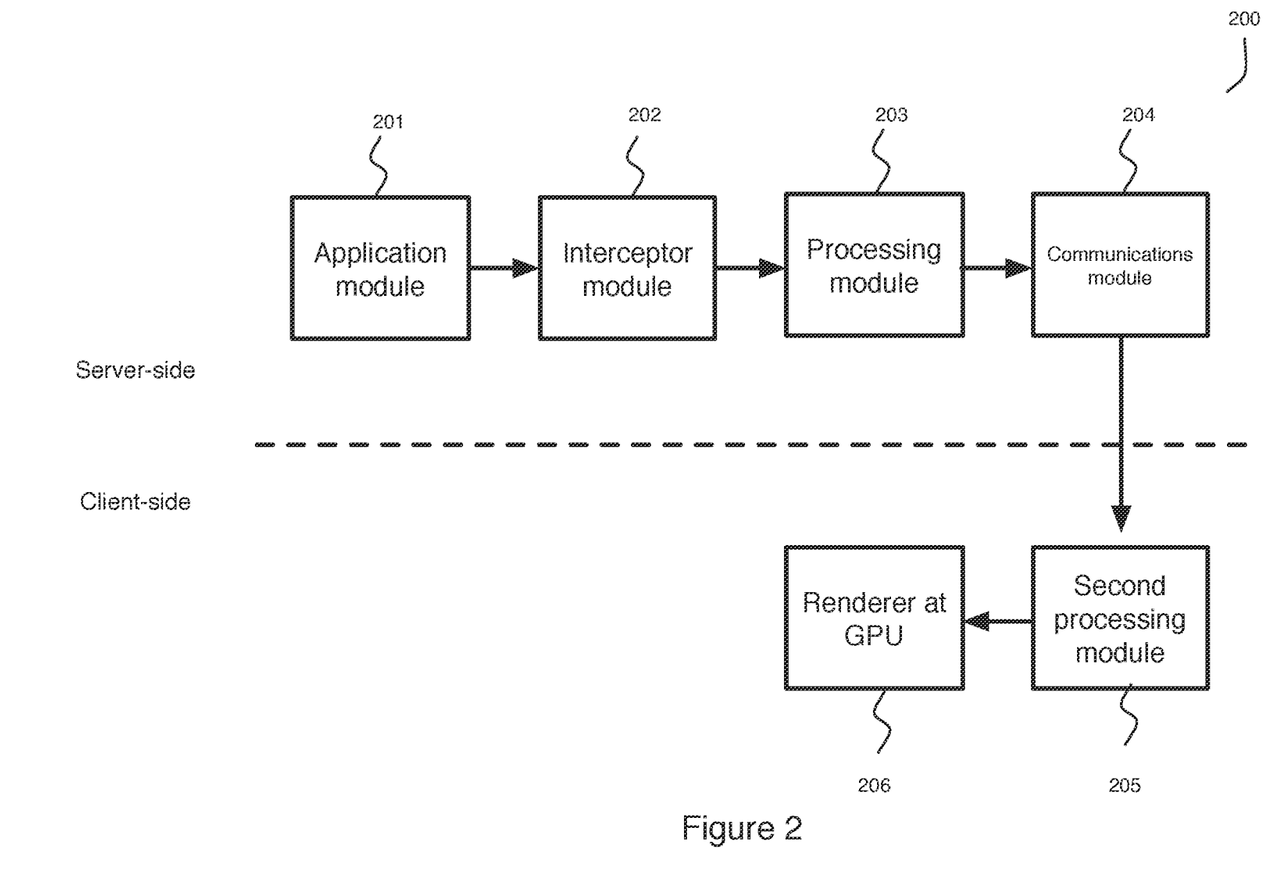
FIG. 2: shows a block diagram illustrating a processing pipeline in accordance with an embodiment of the invention.

In FIG. 2, a graphics processing pipeline 200 in accordance with an embodiment of the invention will be described.

An application module 201 is shown. The application module 201 may be a standard software deployment of an application that generates graphics in response to user input, such as a computer games application.

The application module 201 generates graphics instructions for intended transmission to a local graphics processing unit (GPU).

These instructions may be intercepted by an interceptor module 202, and, therefore, usefully, the application module 201 does not need to be modified to function within an embodiment of the graphics processing system of the present invention.

The interceptor module 202 may divert all these instructions to a processing module 203. Therefore, the apparatus executing the application module 201 does not require, or is not required to use, a graphic processing unit (GPU). Therefore, it will be appreciated, that in some embodiments, the local graphics processing unit (GPU) does not need to exist locally but may be merely a virtualised or spoofed GPU appearing as a local actual GPU to the application module 201.

The processing module 203 may process the graphics instructions to generate graphics data, such as graphics state, static resources, video resources or dynamic resources.

The processing module 203 may then utilise this graphics data to generate index information.

The index information may be transmitted via a communications module 204 to a remote device.

A second processing module 205 at the remote device may receive this index information and retrieve from local storage at the remote device graphics data corresponding to the index information.

This graphics data may be utilised by a renderer 206 at a graphics processing unit (GPU) at the remote device to render graphics.

Figure 3:
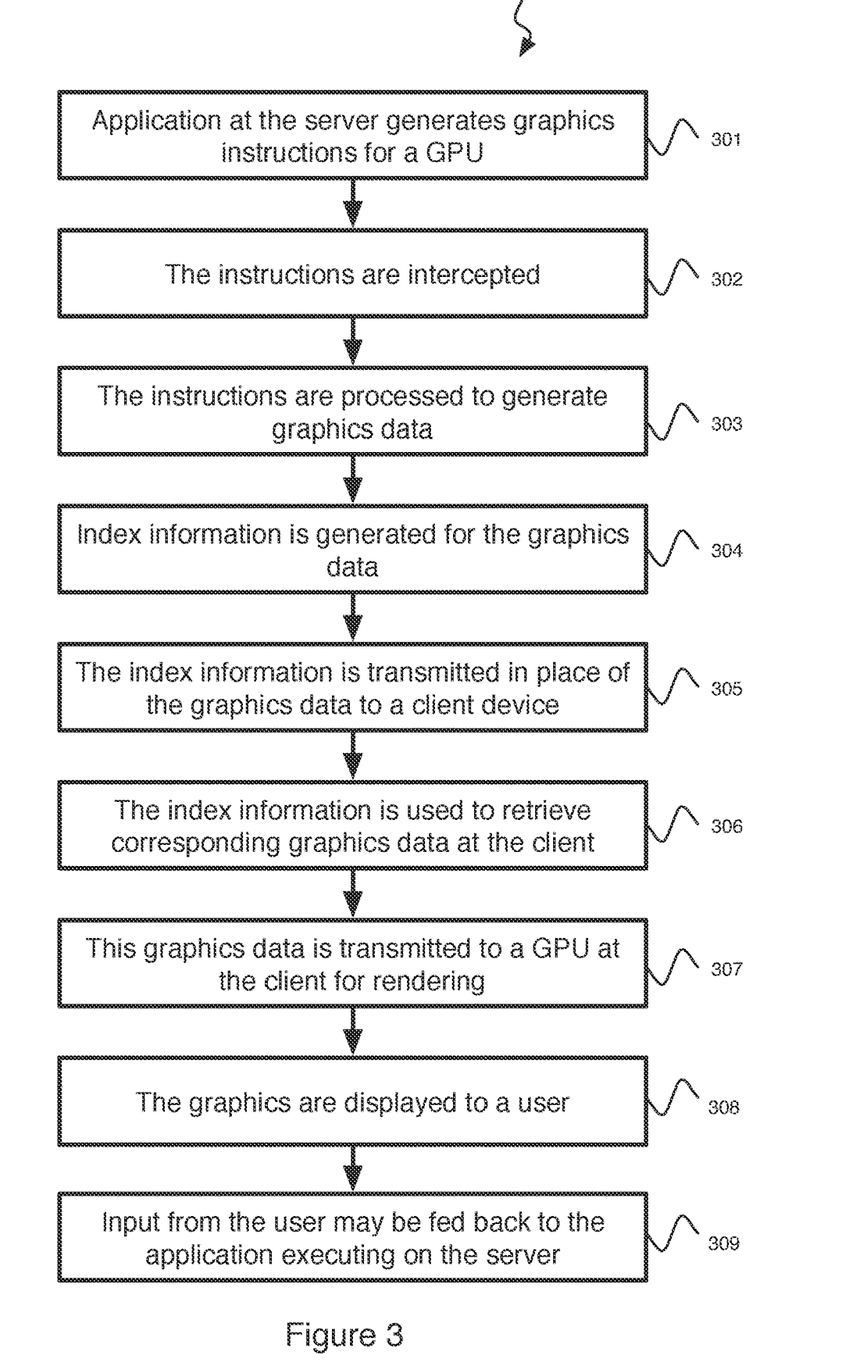
FIG. 3: shows a flow diagram illustrating a method in accordance with an embodiment of the invention.

In FIG. 3, a method 300 of streaming interactive graphics from a server to a client device will be described.

In step 301, an interactive graphics application executing on a server generates graphics instructions for a graphical processor unit (GPU).

In step 302, these instructions are intercepted, for example, by an interceptor module.

In step 303, these intercepted instructions are processed, for example by a processing module, to generate graphics data. The graphics data may include graphics state, static resources, video resources, and/or dynamic resources.

In step 304, index information is generated for the graphics data. For example, objects within the graphics data may be hashed to generate a hash code.

In one embodiment, where the dynamic resource is a vertex buffer, the vertex buffer may be partitioned and hashed to reduce unnecessary retransmission of the entire vertex buffer following a change. For example, the vertex buffer may be divided into blocks and a hash generated for each run of modified blocks. The run of blocks may be trimmed run of blocks such that the hash is generated from the first change in the first block of the run to the last change within the last block of the run.

In step 305, this index information is transmitted in place of the graphics data to a client device.

In step 306, the index information is used to retrieve corresponding graphics data at client device.

In step 307, this graphics data is transmitted to a graphical processing unit (GPU) at the client device to render the graphics.

In step 308, the graphics may be displayed to a user.

In step 309, the user may provide input which is fed-back to the executing interactive graphics application on the server.

In one embodiment, the method further includes the step of synchronising graphics data between the server and the client device. During synchronisation, only a portion of the graphics data may be transmitted. For example, mipmaps may be deleted from the graphics data before transmission and regenerated at the client, reduced resolution textures may be sent in place of high resolution textures based on the resolution capabilities of the client device, and actually utilised texture data may be transmitted to the client device.

With reference to FIGS. 4 to 8, one embodiment of the present invention will be described.

This embodiment permits a server to offer a plurality of applications that can be invoked remotely from a client device. The application logic runs on the server and the graphical output of the application is streamed to the client device over the internet for local rendering.

It will be appreciated that the various features described in relation to this embodiment could be all be implemented to deliver the system or could be implemented in part to deliver a potentially less effective system.

Figure 4:
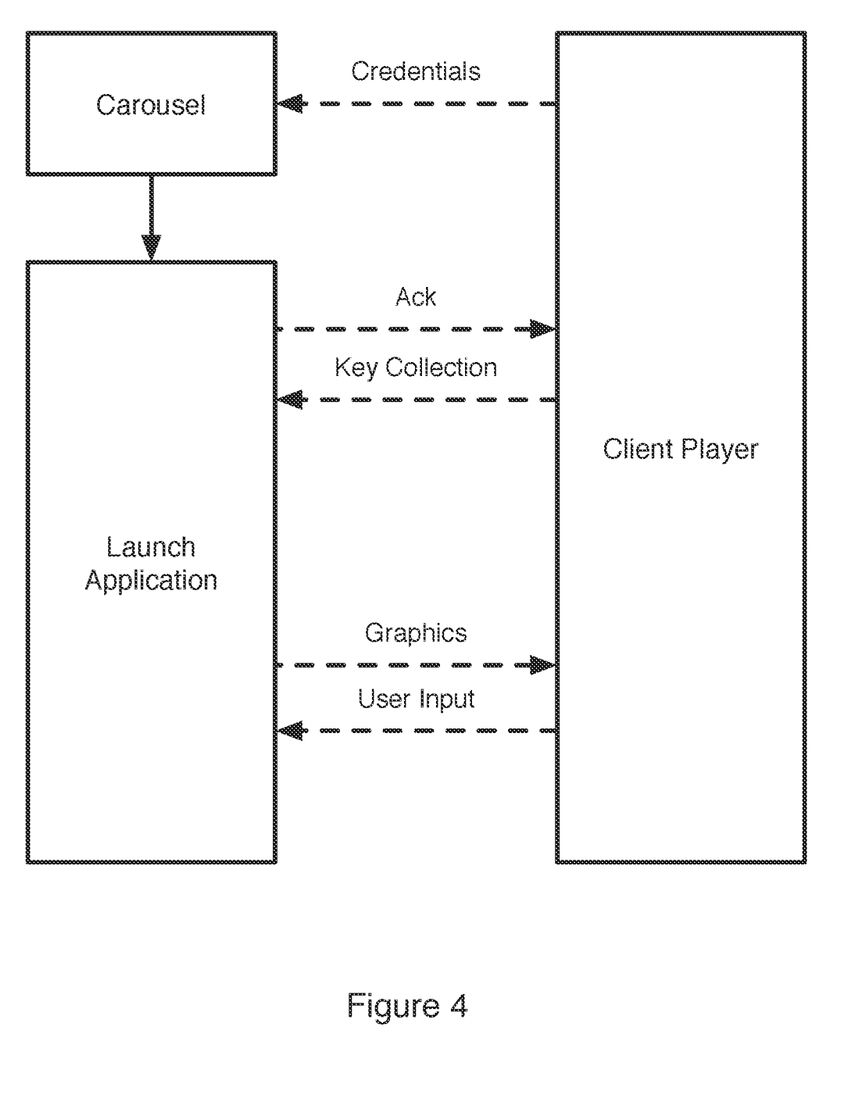
FIG. 4: shows a block diagram illustrating interaction between the client player and server in accordance with an embodiment of the invention.

As shown in FIG. 4, the process starts with a client Player app being run on the client device (PC, tablet, smart TV, mobile). This app connects using an internet protocol such as TCP/IP or UDP to an agent service running on the server which allows access to launch a session to a valid client.

Figure 5:
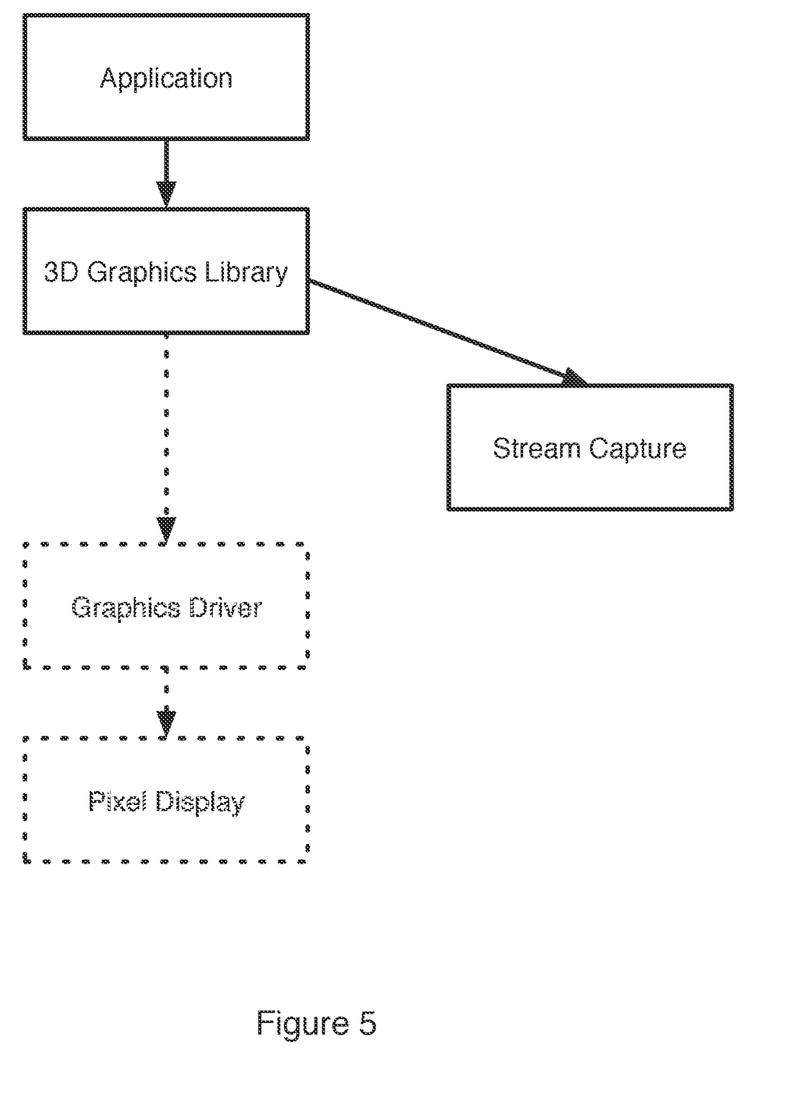
FIG. 5: shows a flow diagram illustrating interception of graphics instructions in accordance with an embodiment of the invention.

In normal operation, the side effect of an application calling a 3D graphics driver would be the calculation of pixels written into a Framebuffer and displayed. As shown in FIG. 5, the process of this embodiment works by interposing on an existing application running on a server with a proxy that directs the graphics command stream and all associated resources to the system of the present invention.

The proxy manages transmission of the data to a remote client device where it is rendered and the current image created.

The amount of data flowing from the application to the 3*d* graphics system is typically substantial and may be difficult to deliver to a remote client without resorting to the semantic-driven compression process described below.

This embodiment of the present invention works by leveraging knowledge of what the data flowing from application to graphics system represents and how it can be handled in an efficient manner. This data stream can viewed as for Extending state, Evolving state and Side Effects (typically GPU commands) on the remote device.

This embodiment makes the observation that while frames are being generated at 30 Hz or more, the Working Set of graphics assets evolves at a more modest speed because there is typically geometric inter and intra-frame coherence. It is also observed by the inventor that because the data stream is generated by an application that has—at some level of granularity—a fixed dispatch sequence, this can be used to avoid transmission of data previously sent to the client device.

When a Client connects to the service, as part of the handshaking protocol it gives the server:

A Client Profile detailing its graphics, audio, input and display capabilities and requested resolution. These graphics capabilities are used to ensure the Proxy emulates what the client is able to perform.

A Hash Key Collection where each key uniquely identifies a blob of data the client has cached locally. This cache can be populated by previous sessions, speculatively from a CDN (Content Delivery Network) or from removable media such as USB sticks.

Figure 6:
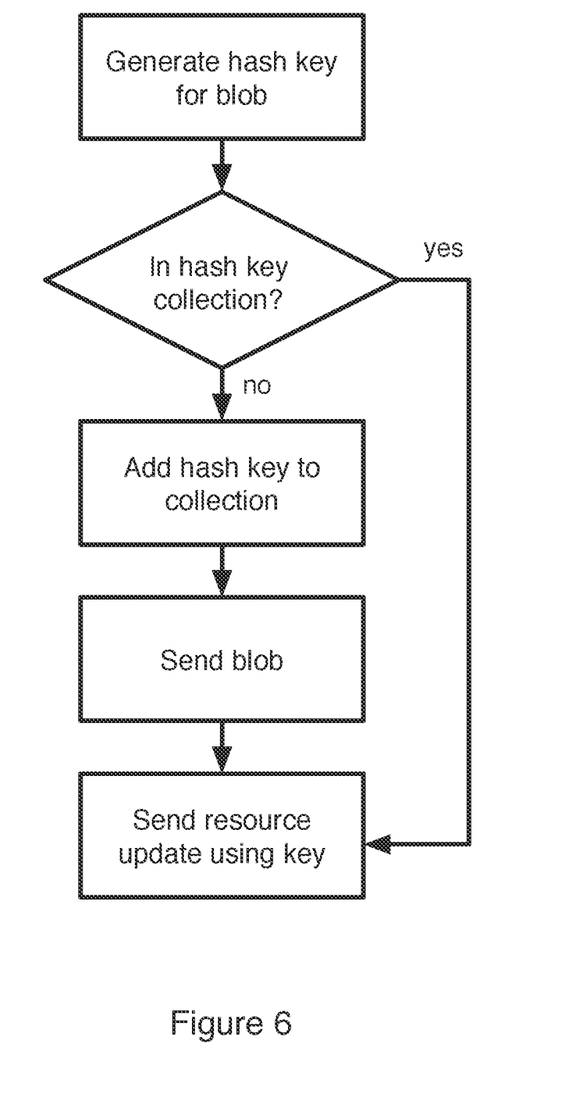
FIG. 6: shows a flow diagram illustrating creation of the hash key collection in accordance with an embodiment of the invention.

The Hash Key Collection ensures that the server will always use a hash key (also known as a data digest) rather than resending data thus reducing the bandwidth requirements. The general technique is shown in FIG. 6.

The hash key is generally much smaller than the data it represents, being typically a 64 or 128 bit key. However bandwidth may be further reduced by keeping a small additional cache (e.g. 256 entries) of indexes to recently used hash keys to data blobs. This allows the "Send Resource Update" command to be reduced in size.

Graphics Commands

Figure 7:
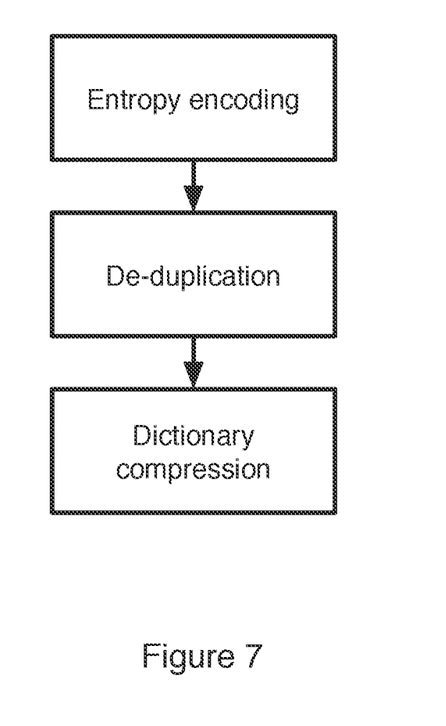
FIG. 7: shows a flow diagram illustrating graphics command compression in accordance with an embodiment of the invention.

Graphics commands are captured as they are issued by the application and procrastinated until as late as possible before being de-duplicated with respect to the client historical graphics commands and semantic history, compressed with semantic driven techniques such as quantization or variable length coding and entropy coded as shown in FIG. 7.

The trigger for emitting the command stream is the appearance of a Side Effect command such a Draw command or Frame End command at which point the Graphics State that has been changed by the application is resolved to ensure it is synchronised on the remote device.

The amount of data a frame of application graphics commands requires, while clearly application-dependent, is typically low because the graphics commands (but not necessarily the graphics parameters) used in the current frame are very similar to the graphics commands of the previous frame.

Resolving Changed State

There are a number of types of state used in real-time graphics and each one may be handled differently:
  Graphics State
  Static Resources
  Video Resources
  Dynamic Resources Graphics State Graphics state encompasses all state that controls the operation of the client graphics system. It includes RenderState and miscellaneous fixed-function controls (for example Viewport size, Framebuffer clearing color) as well as Shaders and their Constants. These are handled by aggressively shadowing server-client state to reduce unnecessary transmission as well as packing common renderstate bursts used by graphics applications into custom codes—for example, almost all graphics programs when establishing a new texture to use, also set the minification and magnification filtering as well as wrapping modes. All of these can be compressed into a single low-overhead command.

Shader Constants (also known as Uniforms), Constant Buffers and Push Constants are the method by which a graphics application parameterizes its shader code. For shader model 4 APIs such as Direct3D 9, shader constants are presented to the application as a linear register file of N 4-tuples where N is typically >128. For shader model 5 and above APIs such as Direct3D 11, constant buffers are presented as contiguous memory where typically this memory is less than 64 Kb per buffer. This register file, constant buffers and push constants can be used in a variety of application specific ways, meaning analysis and processing is necessary to prevent shipping the entire contents every time a shader is used. While typically associated with the graphics state, these constant buffers are treated as dynamic resources in order to further reduce bandwidth.

Static Resources

The lifecycle of static resources is such that once created, they are simply referenced as part of the graphics processing until they are no longer needed, at which point they are disposed.

For static assets this works in a straightforward manner because any reading/writing to an asset made by the application can be interposed and the hashed contents can be checked against the Hash Key Collection.

As part of the standard 3d graphics APIs (Application Programming Interface), when interacting with graphics resources, the application must provide flags indicating its intention. These flags are used by the regular graphics drivers to optimize performance on the local machine.

In this embodiment, the flags may be repurposed to help identify resources that are likely to be unchanging. In the current embodiment, if a resource is flagged "WRITE_ONLY" and has touched all the memory of that resource, it can be surmised to be a static resource—for example a static geometry mesh. This can be hashed, the Hash Key Collection checked and optionally delivered to the client device.

Shader code is always static and the Hash Key Collection probed as described above. Client devices may use different languages for shaders so automated shader translation functionality may be used on the server to convert shaders written in a shading language such as HLSL into another shading language, that is used by the client device, such as GLSL before hashing.

Likewise, Vertex Declarations and Input Layouts describe the layout of Vertex buffers and are static.

Textures in the vast majority are also static assets but pose the problem that they are large resources. The current embodiment mitigates this by:
  Only transmitting the textures that are actually used. A further refinement may be to identify the portion of a texture that is actually used by examining the geometry texture coordinates which specify the region of the texture atlas to map.
  Controlling the capabilities of the Proxy graphics driver to reduce the apparent maximum texture size that will be accepted from the application. This leverages the fact that graphics applications are designed to run on a wide range of performance profiles with it being a general requirement that the application can vary fidelity based on the features and performance of the users' graphics drivers. By varying the proxy driver capabilities, the application can be indirectly controlled.
  Identifying textures where mipmaps can be generated on the client from the top-level texture thus reducing by 33% the amount of data being sent. A further refinement may be to gather data from previous play sessions that determine which mipmaps of a texture are actually used. It is not uncommon for 3d content to have textures that are much higher resolution than required for the resolution that they are being run at.
  Gathering textures used by application as an offline preprocessing step and compressing them further, creating what is commonly defined as super compressed textures. These smaller textures would then be cached on the server or a CDN and served to the client device instead of the original textures.

Video Resources 3d applications may use video in a variety of containers such as mp4 or avi and codec formats such as h264 or bink. While video resources may be treated as a sequence of uncompressed textures to be sent to the client device, it is far more bandwidth efficient to use the already encoded video itself.

In the one embodiment, an offline preprocessing step may be used to gather the videos used by the application and convert them from their native format and container to h264/mp4, if they are not already in the desired format. Then the system may interpose on the APIs that render video content such as Microsoft Media Foundation and gather information about what video frame should be displayed and when, using a library such as FFMPEG. Once that frame as been identified it can be extracted it from its container in raw compressed form and sent it to the client device to be decoded and played back as native video.

Dynamic Resources

As well as static resources, 3d applications often have resources that evolve over time and these pose a challenge to a bandwidth restricted client device. The most common dynamic edits to resources is with a special buffer contain geometric information called a Vertex Buffer. The format of this Vertex Buffer is flexible and is defined by a previously declared Vertex Declaration or Input Layout which describes the different fields and offset of the Vertex Buffer so that graphics hardware can interpret the data.

Resources that are dynamically updated by the application can use a Lock/Unlock paradigm to ensure that the consumer of the data, the graphics hardware and producer of the data, the application, do not conflict.

It is common for 3d applications to Lock a Vertex Buffer containing geometry, make a change and then use that data to draw some element of the display. The Lock API generally provides parameters for indicating which part of the Vertex Buffer will be edited, however, these are often set by applications to the entire buffer because the "contract" the application makes with a Lock operation is simply that it guarantees not to change data that is being used by the graphics hardware.

This problem may be solved by introducing a HashedBlockBuffer process between the application and VertexBuffer. As with other parts of this invention, information about how to process the Vertex Buffer from prior structures that have been declared as well as empirical knowledge about how Vertex Buffers are used in practice may be leveraged.

The HashedBlockBuffer segments the Vertex Buffer into fixed length blocks. In the current embodiment, 4096 byte blocks are used, but this can be tuned for performance reasons.

In order to ensure a match is obtained within the Hash Key Collection, the same runs of changed data must be precisely identified. Identifying inclusive runs will yield a different hash and therefore not allow avoidance of sending large amounts of data. The current embodiment uses runs of dirty blocks to identify regions needing updating.

These regions are further refined by using the start on the first block and the end for the last block where data differs to produced a "trimmed run of dirty blocks". Additionally the Vertex Declaration that is currently in effect to ensure the data is treated at the correct granularity is used—that is hashing is not started in the middle of a Vertex structure because the first few bytes happened not to differ. By using the Vertex Declaration this embodiment steps back to the beginning of an integral vertex and finishes at the end of an integral vertex.

The next problem is that it is common, indeed encouraged, for graphics applications to interleave different vertex data types in a Vertex Buffer. However, it is also common, not to update all fields of a vertex. For example the vertex color and vertex texture coordinates may be constant but the position of the vertex is being changed.

A (pseudo-code) Vertex Declaration might look like this:

| Offset | Usage | Type |
|---|---|---|
| 0 | POSITION | FLOAT3 |
| 12 | COLOR | UBYTE4 |
| 16 | TEXCOORD | FLOAT2 |

While the trimmed run of dirty blocks could be hashed and such an embodiment of the system will run, bandwidth may be reduced further by using the Vertex Declaration in an operation to process the trimmed run of dirty blocks on a per stripe basis.

| Vertex Buffer | Position hash | Color hash | Texcoord hash |
|---|---|---|---|
| POSITION | POSITION | | |
| COLOR | | COLOR | |
| TEXCOORD | | | TEXCOORD |
| POSITION | POSITION | | |
| COLOR | | COLOR | |
| TEXCOORD | | | TEXCOORD |
| POSITION | POSITION | | |
| COLOR | | COLOR | |
| TEXCOORD | | | TEXCOORD |
| POSITION | POSITION | | |
| COLOR | | COLOR | |
| TEXCOORD | | | TEXCOORD |
| POSITION | POSITION | | |
| COLOR | | COLOR | |
| TEXCOORD | | | TEXCOORD |

That is, the system may stride through the vertex buffer (optionally compressing) and hashing like-typed data together so that in this example the system generates 3 hashes for the 3 fields each vertex has. The result is that the system will get a hit in the Key Collection for the COLOR stripe and TEXCOORD stripe and not need to send these to the client device. The changing vertex positions will need to be sent if, and only if, the system has not seen these vertex positions before.

Buffer Re-Use

In the current embodiment, the system interposes on the Microsoft DirectX 3d graphics API and leverages the additional semantic insight obtained from the flag parameters provided when the application Locks a Vertex Buffer and the "best-practice" calling sequence encouraged by Microsoft.

A common use-case for Vertex Buffer Locking is to incrementally fill a buffer with dynamically generated geometry until it is full and then start again at the beginning. In order to ensure that the graphics hardware can continue to operate at full speed, the graphics API introduces 2 additional flags for the application: NO_OVERWRITE and DISCARD.

NO_OVERWRITE means the application makes a promise never to overwrite any data in the buffer it has previous written. The reason for this promise is that the graphics hardware can be confident in using memory mapping, direct memory access (DMA) or any other means to access this data and guarantee it is not stale.

DISCARD means the application indicates the buffer is "write once" and will never be subsequently read from. The reason for this promise is it allows the graphics hardware to continue operating on the existing buffer while the application fills a new buffer and when it is Unlocked, silently swap the buffers inside the driver and dispose of the other buffer knowing it will never be needed again.

Application developers are encouraged to use these 2 flags together by incrementally filling a NO_OVERWRITE buffer with graphics data, drawing some portion of it. When they reach the point of not being able to fit any more data in the buffer, they Lock with a DISCARD flag, and start filling from the start of the buffer again. This system allows the graphics hardware to operate at maximum efficiency.

Figure 8:
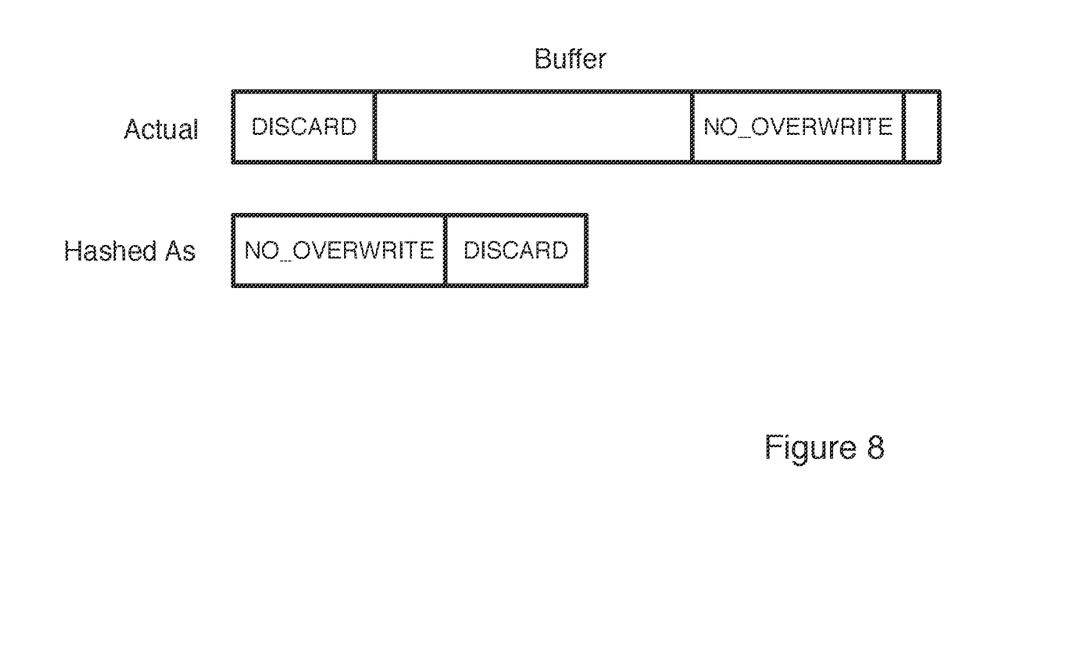
FIG. 8: shows a block diagram illustrating hashing of vertex buffer blocks in accordance with an embodiment of the invention.

As shown in FIG. 8, this embodiment of the invention leverages this knowledge to identify when the system detects a short dirty run of blocks at the beginning of a DISCARD buffer following the same buffer being locked for OVERWRITE is highly likely to be related. This short dirty run of blocks in the DISCARD buffer will likely not match the Hash Key Collection and require sending.

Therefore, the new DISCARD buffer run can be treated as a continuation of the previous run at the end of the buffer to ensure a Hash Key Collection match.

Shader Reflection

Shaders are small bundles of code and data that operate on application data to convert application data (typically but not exclusively, geometry) into shaded pixels. Shaders specify what the data buffers that are to be processed contain both structurally and semantically in Vertex Declarations or Input Layouts. They are used to describe to the graphics hardware what data to expect. It is not uncommon in realtime graphics applications for the data buffers to contain more information than is required during a specific rendering Draw Call so this knowledge can be leveraged to examine the data buffers and only transmit what is required by the Shader. An example would be a geometry buffer than may can contain vertices that each contain Position, Normal, Texture UV and Color yet the Shader is only using Position for this rendering. By only transmitting the necessary fields, we can reduce the amount of data being sent and reduce bandwidth usage.

Constant Buffers contain register data that is used by the Shader for rendering. The contents of the constant buffers are updated frequently, typically once or more times per Draw Call. Information about the structure and semantics of the data in the constant buffers in typically provided by shader reflection. Shader reflection can be gathered in a number of ways such as using the D3DReflect API for Direct3D 9 or by parsing shader bytecode directly. By leveraging shader reflection, the data buffers that otherwise would have to be treated as opaque bytes, can now be treated as discrete chunks of data with specific sizes and internal fields. For example, instead of treating a constant buffer as a memory buffer of say 20 bytes, using the reflection information it is possible to know that the buffer contains 12 bytes of normal data divided in 4 bytes each of X, Y, Z floating point fields, followed by 8 bytes of texture coordinate data divided in 4 bytes of U, V floating point fields. Semantic knowledge of the contents of the data buffers and constant buffers can also be leveraged by compressing the data with specific algorithms tailored to those semantics. For example, once it is known that the buffer contains normal data, we can compress it using signed octahedron encoding or spherical coordinate encoding. Regardless of the algorithms used or the type of data presented, we can leverage the knowledge of their structure and semantics to reduce the amount of data sent.

Unique Draw Commands

Figure 9:
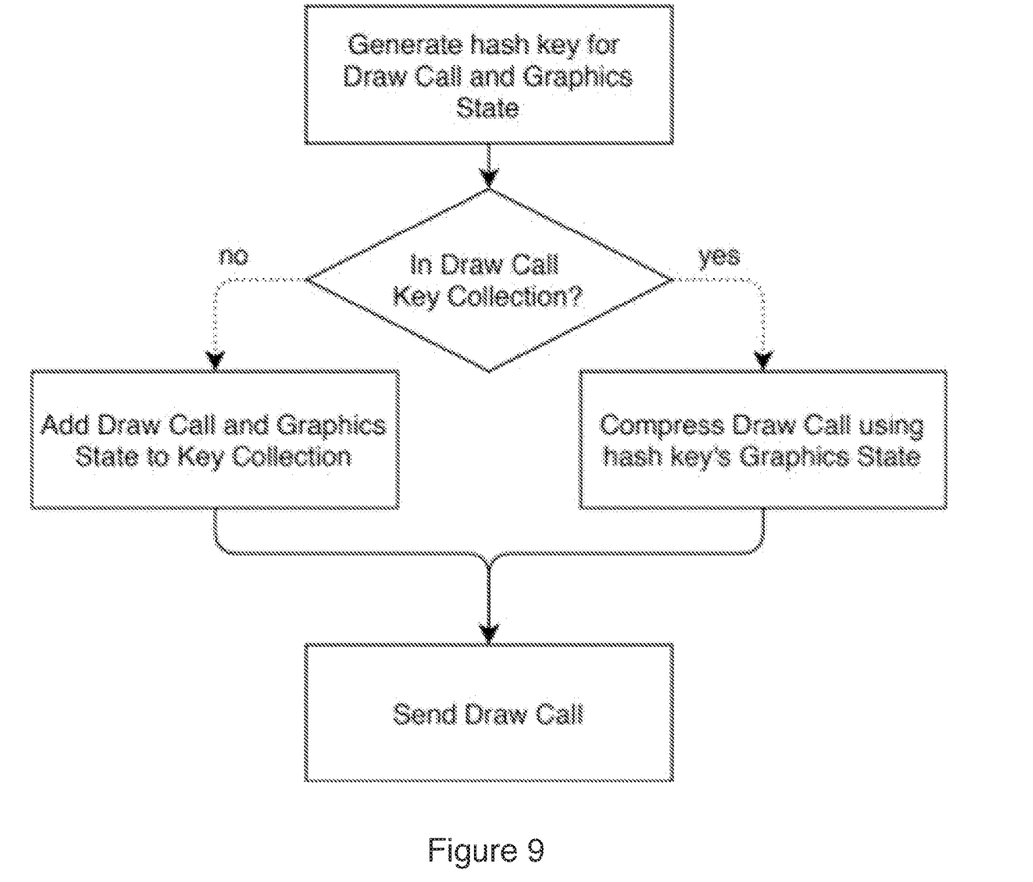
FIG. 9: shows a flow diagram illustrating use of a draw call key collection in accordance with an embodiment of the invention.

In realtime graphics the image is rendered many times per second (typically 30 or 60 Hertz), yet the rate at which the data evolves is often much slower with much of the data remaining constant between rendered frames. This 'inter frame coherence' can be leveraged because subsequent frames will often use the same Draw Call parameters and Graphics State. We make use of a Draw Call Key Collection where each key uniquely identifies a Draw Call and its associated Graphics State the client has cached locally. This Collection behaves similarly to the Hash Key Collection for blobs of data. Once a key is found matching, meaning it is not the first time the Draw Call is encountered, then we can use the Graphics State associated with its key to compress the Draw Call and its Graphics State, thus reducing the bandwidth requirements. The general technique is shown in FIG. 9.

Draw Calls and Graphics State not found in the Draw Call Key Collection can still be compressed taking advantage of 'intra frame' coherence before being sent. If a Draw Call is found in the Collection then in addition to 'intra frame' it can also be compressed leveraging 'inter frame' coherence.

Potential advantages of some embodiments of the present invention are that:

a) Specialist, power-hungry GPUs are not required on the servers and so generic servers can be used. This in turns means the number of users per server can be higher thus reducing running costs.

b) The invention may be resolution independent and can be played back at high resolution without increasing stream bandwidth requirements unlike pixel-based video compression.

c) The bandwidth requirement can be extremely low (<1 Mbs) for some applications running at high resolution because compression that leverages knowledge about what is being compressed is relied on.

d) The invention may require no changes to the existing application executable, and thus requires no access to source code for modification so can be used on existing and legacy software.

e) Arbitrary new Content can be injected into the stream in real-time to re-purpose it for new devices and platforms. For example overlays for virtual buttons when running on tablets can be created, banner advertisements around the content can be introduced, and images to insert advertising inside a video game's virtual world can be replaced.

f) Fine-grain resource usage information from users can be collected to help refine where assets are kept on the CDN (Content Delivery Network) as well as removing redundant data from the stream for future users.

g) Interactive, real-time graphics application (at least 30 times per second refresh) can be executed on a server with contemporaneous display on a remote device.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method of streaming interactive computer graphics from a server to a client device, wherein the client device includes local storage and a client-side graphical processing unit (GPU), the method including:
   a) intercepting, at the server, graphics instructions transmitted from an application destined for a graphical processing unit (GPU) at the server, wherein the application is being executed at the server;
   b) processing the graphics instructions to generate graphics data at the server, wherein the graphics data includes a vertex buffer, wherein the vertex buffer is divided into blocks, and wherein the vertex buffer is further divided into stripes corresponding to different vertex fields;
   c) generating index information for at least some of the graphics data at the server, including particular index information that indexes one or more portions of the vertex buffer that have been modified due to execution of one or more of the graphics instructions, wherein the index information is generated for a run of blocks in the vertex buffer that have been modified, and wherein individual values of the index information are generated for individual ones of the stripes that have been modified;

d) transmitting the index information in place of the graphics data from the server to the client device, wherein the transmitted index information includes the particular index information that indexes the one or more portions of the vertex buffer that have been modified;

e) extracting, by the client device, corresponding graphics data that corresponds to the graphics data, wherein the corresponding graphics data is stored in the local storage, and wherein extracting the corresponding graphics data utilizes the transmitted index information; and f) rendering computer graphics by the client-side graphical processing unit (GPU) using the corresponding graphics data and the transmitted index information.

2. The method of claim 1, wherein the graphics data includes one or more from the set of graphics state, static resources, and dynamic resources.

3. The method of claim 1, wherein objects within the graphics data are hashed to generate the index information.

4. The method of claim 1, wherein the index information is generated for a trimmed run of blocks that have been modified such that the run extends from a first modified bit within a first block in the trimmed run to a last modified bit within a last block in the run.

5. The method of claim 1, further including:
synchronizing the graphics data between the server and the client.

6. The method of claim 5, wherein, when the graphics data includes textures, only data for the textures that are used are synchronized.

7. The method of claim 5, wherein a profile of the client device determines the synchronization of graphics data.

8. The method of claim 7, wherein the profile of the client device determines the synchronization of graphics data by assigning lower resolution graphics for higher resolution graphics at the client device.

9. The method of claim 1, further comprising:
displaying the rendered computer graphics on a display at the client device.

10. The method of claim 9, further comprising:
receiving, by the client device, user input in response to the displayed computer graphics; and
transmitting the user input back to the application that is being executed on the server.

11. The method of claim 10, wherein the user input is transmitted, at least in part, using User Datagram Protocol (UDP).

12. The method of claim 11, wherein State Transition Events are synthesized on the server.

13. The method of claim 1, wherein the application is selected for execution at the server by a user from a plurality of applications.

14. A client device configured for use with the method of claim 1.

15. A system for streaming interactive computer graphics, including:
a server configured for:
 (i) executing an application,
 (ii) intercepting graphics instructions transmitted from the application destined for a graphical processing unit (GPU) at the server,
 (iii) processing the graphics instructions to generate graphics data, wherein the graphics data includes a vertex buffer, wherein the vertex buffer is divided into blocks, and wherein the vertex buffer is further divided into stripes corresponding to different vertex fields, wherein the different vertex fields include vertex color, vertex texture coordinate, and vertex position,
 (iv) generating index information for at least some of the graphics data at the server, including particular index information that indexes one or more portions of the vertex buffer that have been modified due to execution of one or more of the graphics instructions, wherein the index information is generated for a run of blocks in the vertex buffer that are dirty, and wherein individual values of the index information are generated for individual ones of the stripes that have been modified, and
 (v) transmitting the index information in place of the graphics data from the server to a client device, wherein the transmitted index information includes the particular index information that indexes the one or more portions of the vertex buffer that have been modified; and
the client device configured for:
 (i) extracting corresponding graphics data that corresponds to the graphics data, wherein the corresponding graphics data is stored in local storage at the client device, and wherein extracting the corresponding graphics data utilizes the transmitted index information; and
 (ii) rendering computer graphics at a client-side graphical processing unit (GPU) using the corresponding graphics data and the transmitted index information.

* * * * *